(12) United States Patent
Kwan

(10) Patent No.: US 9,163,153 B2
(45) Date of Patent: Oct. 20, 2015

(54) METALLIC INK COMPOSITION AND WRITING INSTRUMENT CONTAINING SAME

(71) Applicant: Wing Sum Vincent Kwan, Chicago, IL (US)

(72) Inventor: Wing Sum Vincent Kwan, Chicago, IL (US)

(73) Assignee: SANFORD, L.P., Downers Grove, IL (US)

( * ) Notice: Subject to any disclaimer, the term of this patent is extended or adjusted under 35 U.S.C. 154(b) by 76 days.

(21) Appl. No.: 13/834,646

(22) Filed: Mar. 15, 2013

(65) Prior Publication Data

US 2014/0272141 A1 Sep. 18, 2014

(51) Int. Cl.
*C09D 11/02* (2014.01)
*C09D 11/17* (2014.01)
*B43K 1/00* (2006.01)
*C09D 11/16* (2014.01)

(52) U.S. Cl.
CPC ............... *C09D 11/17* (2013.01); *B43K 1/006* (2013.01); *C09D 11/16* (2013.01)

(58) Field of Classification Search
CPC ..... C09D 11/36; C09D 11/322; C09D 11/326
USPC .................................. 106/31.6, 31.86, 31.65
See application file for complete search history.

(56) References Cited

U.S. PATENT DOCUMENTS

| | | | |
|---|---|---|---|
| 3,091,545 A | 5/1963 | Adams |
| 3,450,663 A | 6/1969 | Cockerham |
| 3,577,255 A | 5/1971 | Pelke |
| 3,942,903 A | 3/1976 | Dickey et al. |
| 4,218,251 A | 8/1980 | Sanders |
| 4,256,492 A | 3/1981 | Matsumoto et al. |
| 4,296,176 A | 10/1981 | Lennon et al. |
| 4,367,071 A | 1/1983 | Mizuno et al. |
| 4,496,258 A | 1/1985 | Tanaka et al. |
| 4,545,819 A | 10/1985 | Shioi et al. |
| 4,657,591 A | 4/1987 | Shioi et al. |
| 4,664,711 A | 5/1987 | Kawaguchi et al. |
| 4,749,727 A | 6/1988 | Tsuchiya |
| 4,759,650 A | 7/1988 | Granoff |
| 4,857,624 A | 8/1989 | DeBlasi et al. |
| 5,004,763 A | 4/1991 | Imagawa |
| 5,037,475 A | 8/1991 | Chida et al. |
| 5,274,025 A | 12/1993 | Stockl et al. |
| 5,338,793 A | 8/1994 | Loftin |
| 5,340,388 A | 8/1994 | Breton et al. |
| 5,344,670 A | 9/1994 | Palmer et al. |
| 5,344,872 A | 9/1994 | Debord et al. |
| 5,443,628 A | 8/1995 | Loria et al. |
| 5,474,603 A | 12/1995 | Miyashita et al. |
| 5,651,627 A | 7/1997 | Dowzall et al. |
| 5,762,694 A | 6/1998 | Yokoi et al. |
| 5,813,787 A | 9/1998 | Dowzall et al. |
| 5,849,072 A | 12/1998 | Sommer et al. |
| 5,877,235 A | 3/1999 | Sakuma et al. |
| 5,971,646 A | 10/1999 | Chavatte et al. |
| 5,972,083 A | 10/1999 | Iijima |
| 6,063,176 A | 5/2000 | Lyen et al. |
| 6,077,338 A | 6/2000 | Wallstrom |
| 6,083,311 A | 7/2000 | Kanbayashi et al. |
| 6,099,629 A | 8/2000 | Morita et al. |
| 6,120,590 A | 9/2000 | Miyamoto et al. |
| 6,171,381 B1 | 1/2001 | Yoshimura et al. |
| 6,210,063 B1 | 4/2001 | Isobe et al. |
| 6,224,284 B1 | 5/2001 | Sukhna et al. |
| 6,254,297 B1 | 7/2001 | Frazier |
| 6,350,594 B1 | 2/2002 | Clarke et al. |
| 6,402,412 B2 | 6/2002 | Sukhna et al. |
| 6,441,051 B1 | 8/2002 | Wheeler |
| 6,524,382 B1 | 2/2003 | Bujard et al. |
| 6,533,857 B1 | 3/2003 | Schmid et al. |
| 6,544,323 B2 | 4/2003 | An et al. |
| 6,561,713 B2 | 5/2003 | Sukhna et al. |
| 6,599,353 B2 | 7/2003 | Spencer et al. |
| 6,616,741 B1 | 9/2003 | Sawa et al. |
| 6,663,704 B2 | 12/2003 | Spencer et al. |
| 6,706,103 B2 | 3/2004 | Yoshimura et al. |
| 6,730,154 B2 | 5/2004 | Inoue et al. |
| 6,730,717 B2 | 5/2004 | Yoshimura et al. |
| 6,749,676 B2 | 6/2004 | Spencer et al. |
| 6,770,689 B1 | 8/2004 | Yoshimura et al. |
| 6,786,956 B2 | 9/2004 | Ichikawa |
| 6,854,320 B2 | 2/2005 | Wolford et al. |
| 6,890,584 B2 | 5/2005 | Leenders et al. |
| 7,018,122 B2 | 3/2006 | Kwan et al. |
| 7,135,507 B2 | 11/2006 | Sexton |

(Continued)

FOREIGN PATENT DOCUMENTS

| | | |
|---|---|---|
| CA | 1029144 | 4/1978 |
| CH | 532651 | 1/1973 |

(Continued)

OTHER PUBLICATIONS

Aldrick Catalog Handbook of Fine Chemicals , pp. 1225 and 1430 (1998-1999).*
Aldrich Catalog Handbook of Fine Chemicals, pp. 283, 292, 747, 1217 and 1735 (1989-1999).
*Dri Mark Products Inc.* v. *National Ink Inc. and Dixon Ticonderoga Co.*, 01 Civ. 6541 (HB), 2002 U.S. Dist. LEXIS 6361 (S.D.N.Y. Apr. 11, 2002).
High-Performance Metallics Gold for Printing Inks brochure, Schlenk Metallpulver GMBH & CO. KG (2 pages) (printed Mar. 2006).
International Search Report and Written Opinion for international application No. PCT/US2012/071287, mailing date Apr. 17, 2013.
International Search Report for EP 1095991, mailing date Sep. 24, 2001.
International Search Report for PCT/US02/36869, mailing date Feb. 17, 2003.
Lactol Spirits Material Safety Data Sheet (online, retrieved May 3, 2006). Downloaded from the Internet at: <http://www.setonresourcecenter.com/msds/docs/wcd00045/wcd0454a.htm>.

(Continued)

*Primary Examiner* — Veronica F Faison
(74) *Attorney, Agent, or Firm* — Marshall, Gerstein & Borun LLP

(57) ABSTRACT

Metallic ink compositions for use in capillary-action markers are provided. More particularly, a metallic ink composition includes a polar solvent, an encapsulated metallic pigment, and a resin component.

22 Claims, No Drawings

(56) References Cited

U.S. PATENT DOCUMENTS

| | | | |
|---|---|---|---|
| 7,208,036 B2* | 4/2007 | Fukuo et al. | 106/31.86 |
| 7,297,729 B2 | 11/2007 | Sexton et al. | |
| 7,364,614 B2 | 4/2008 | Kwan et al. | |
| 7,455,724 B2 | 11/2008 | Kwan et al. | |
| 7,828,888 B2* | 11/2010 | Itano et al. | 106/31.75 |
| 7,829,630 B2 | 11/2010 | Deshpande et al. | |
| 7,981,210 B2 | 7/2011 | Kwan et al. | |
| 8,123,845 B2* | 2/2012 | Omatsu et al. | 106/31.28 |
| 2001/0003262 A1 | 6/2001 | Yoshimura et al. | |
| 2001/0019682 A1 | 9/2001 | Sukhna et al. | |
| 2002/0007768 A1 | 1/2002 | Yoshimura et al. | |
| 2002/0033116 A1 | 3/2002 | Spencer et al. | |
| 2002/0033117 A1 | 3/2002 | Inoue et al. | |
| 2002/0096083 A1 | 7/2002 | Spencer et al. | |
| 2002/0128350 A1 | 9/2002 | Yoshimura et al. | |
| 2002/0148387 A1 | 10/2002 | An | |
| 2002/0197096 A1 | 12/2002 | Sukhna et al. | |
| 2003/0041776 A1 | 3/2003 | Spencer et al. | |
| 2003/0051634 A1 | 3/2003 | Takahashi | |
| 2003/0129015 A1 | 7/2003 | Sexton | |
| 2003/0144375 A1 | 7/2003 | Wu et al. | |
| 2003/0212179 A1 | 11/2003 | Yadav et al. | |
| 2003/0215281 A1 | 11/2003 | Sexton et al. | |
| 2004/0173121 A1 | 9/2004 | Fukuo et al. | |
| 2005/0095055 A1* | 5/2005 | Kwan et al. | 401/198 |
| 2005/0148685 A1 | 7/2005 | Yamamoto | |
| 2005/0159505 A1 | 7/2005 | Yoshimura et al. | |
| 2007/0082977 A1* | 4/2007 | Shibahashi et al. | 523/161 |
| 2008/0182085 A1* | 7/2008 | Oyanagi et al. | 428/195.1 |
| 2009/0025602 A1* | 1/2009 | Kwan et al. | 106/31.65 |
| 2010/0239750 A1 | 9/2010 | Breton et al. | |
| 2011/0179971 A1 | 7/2011 | Proelss et al. | |
| 2012/0067248 A1* | 3/2012 | Kagata et al. | 106/31.65 |
| 2013/0171345 A1 | 7/2013 | Sexton | |

FOREIGN PATENT DOCUMENTS

| | | |
|---|---|---|
| EP | 0761785 | 3/1997 |
| EP | 987304 | 3/2000 |
| EP | 1 038 931 A1 | 9/2000 |
| EP | 1095991 | 5/2001 |
| EP | 1118643 | 7/2001 |
| FR | 2212408 | 7/1974 |
| JP | 2000129188 | 5/2000 |
| JP | 2001354893 | 12/2001 |
| JP | 2003128974 | 5/2003 |
| JP | 2003221542 | 8/2003 |
| SU | 653317 | 3/1979 |
| WO | WO-00/01778 | 1/2000 |
| WO | WO-01/16236 | 3/2001 |
| WO | WO-03/044104 | 5/2003 |
| WO | WO-03/085055 | 10/2003 |
| WO | WO-2005/028214 A1 | 3/2005 |
| WO | WO-2010/069823 | 6/2010 |
| WO | WO-2012/153119 A1 | 11/2012 |

OTHER PUBLICATIONS

P-03 Resin, Terepene Phenolic Resin, Akrochem Corporation (1 page) (publicly available before Dec. 29, 2011).
P-104 Resin Product Sheet, Akrochem Corporation (2 pages) (publicly available before Dec. 29, 2011).
Pentalyn 702-M Rosin Resin Product Data Sheet, Eastman Chemical Co. (1 page) (Sep. 19, 2006).
Pigments for Coatings, World of Metallics, Aluminum & Goldbronze Pigments brochure, Schlenk Metallpulver GMBH & Co. KG (19 pages) (printed Jan. 2010).
Pigments for Printing Inks, World of Metallics Pigments brochure (20 pages) (printed Mar. 2011).
Setaprint™ 1200E Phenolic Modified Rosin Resin product sheet, Lawter Inc. (1 page) (updated Mar. 19, 2012).
Setaprint™ 2404E Phenolic Modified Rosin Resin product sheet, Lawter Inc. (1 page) (updated Mar. 19, 2012).
STAPA 15 VS Aluminum Paste Safety Data Sheet, Eckart America Corporation (9 pages) (printed May 30, 2011).
Styrenated Terpene Resin, Summit Trade (1 page) (publicly available before Dec. 29, 2011).
Sylvares® TP 105 Product Data Sheet, Arizona Chemical (1 page) (Jul. 2009).
Sylvares® TP 2019 Product Data Sheet, Arizona Chemical (2 pages) (Jan. 2005).
Sylvares® TP 2040HME Product Data Sheet, Arizona Chemical (1 page) (Jul. 2009).
Sylvares® TP 2040LO Product Data Sheet, Arizona Chemical (1 page) (publicly available before Dec. 29, 2011).
Sylvares® ZT106LT Resin Product Data Sheet, Arizona Chemical (2 pages) (Jan. 2005).
Tamanol 803L, Terpene Phenolic Resin, Multiple Plus Ltd. (1 page) (publicly available before Dec. 29, 2011).
Terlon® 303A, Ink Resins, Vehicles and Additives Product Guide, Lawter Inc. (8 pages) (2011).
U.S. Appl. No. 13/732,118, "Metallic Ink Composition and Writing Instrument Containing Same", Sexton et al., filed Dec. 31, 2012.
Viscosity Conversion Table, Norcross Corporation (2005).
Wetting and Dispersing Additives Data Sheet, BYK-P 105, published by Byk Chemie, Germany (Jan. 2000).
Zonatac® NG 98 Product Data Sheet, Arizona Chemical ( 2 pages) (Jan. 10, 2007).
International Search Report and Written Opinion, International Application No. PCT/US2014/023304, mailing date Jun. 18, 2014.
Second Written Opinion of the International Preliminary Examining Authority, International Application No. PCT/US2014/023304, dated Feb. 16, 2015.
Material Safety Data Sheet according to Annex II of the EU Regulation 1907/2006, Product Name Norilit® NC 102, dated Sep. 17, 2007 (German with English translation).
International Preliminary Report on Patentability (IPRP) for International Appl. No. PCT/US2014/023304, dated May 28, 2015.

* cited by examiner

METALLIC INK COMPOSITION AND WRITING INSTRUMENT CONTAINING SAME

BACKGROUND

1. Field of the Invention

The invention relates generally to metallic ink compositions for use in capillary-action markers. More particularly, the invention relates to a metallic ink composition comprised of a polar solvent, an encapsulated metallic pigment, and a resin component.

2. Brief Description of Related Technology

Writing instruments capable of making written markings containing metallic pigments are known. For example, valve-action markers capable of making written markings containing metallic pigments have been developed. Typically, such valve-action markers utilize a spring-loaded nib, which opens a valve to an ink reservoir when depressed (e.g., against a writing surface), thereby allowing the ink to flow from the ink reservoir to the nib.

Valve-action markers require more parts than conventional capillary-action markers, and consequently their manufacture is more complicated and costly. Additionally, valve-action markers are problematic in that the metallic pigments tend to settle to the bottom of the ink reservoir when the valve-action markers are not in use. Therefore, the user often has to violently shake the marker prior to using same in order to effect distribution of the metallic pigments throughout the ink composition so as to ensure that the ink composition delivered to the marker nib contains sufficient amounts of metallic pigment to produce the desired visual effect. Moreover, the user typically has no means to verify that the metallic pigment has been adequately distributed throughout the ink composition without writing with the marker because the marker barrel is opaque. The user must also subsequently depress the nib against a writing surface with sufficient force to open the valve to the ink reservoir and allow delivery of the ink composition to the nib as described above. Such forces can cause the nib to excessively wear such that any written markings produced using the same frequently become indistinct over time. In view of the foregoing, other means of delivering metallic ink compositions are desired.

Conventional capillary-action markers typically contain a fibrous ink reservoir and a nib in fluid communication therewith. Such markers typically include an ink composition having a low viscosity because the adhesive forces (between the ink composition and the channel walls of the reservoir and/or nib) must exceed the cohesive forces of the ink composition to permit movement of the composition by capillary-action. Incorporating metallic pigments (e.g., including various metallic pigments such as aluminum and bronze flakes) into the low viscosity ink compositions used in capillary-action markers is often challenging because such metallic pigments tend to settle out of the ink compositions as set forth above. Even when the metallic pigments are adequately suspended in the ink compositions, the marker's fibers frequently undesirably "filter" the metallic pigments and become clogged over time. Accordingly, over time, the marker can be rendered incapable of making written markings containing metallic pigments.

U.S. Pat. No. 6,120,590 to Miyamoto discloses a ball point pen containing a water-based, thixotropic gel ink having metallic lustrous color. Such thixotropic gel inks, however, are too viscous to be successfully adapted for use in many writing instruments, including conventional capillary-action markers.

Capillary action markers including inks containing metallic pigments are, however, known in the art. U.S. Pat. No. 7,135,507 to Sexton discloses a capillary action marker containing an ink including an aqueous dispersion of a metallic pigment and a specific hydantoin-formaldehyde co-polymer film-forming resin, optionally together with one or more of a color agent, a pH-adjusting agent, anti-settling agent, or a preservative. Additionally, U.S. Pat. No. 7,297,729 to Sexton discloses a capillary action marker containing an ink including a nitro solvent, a film-forming resin, a pigment or dye, and optionally, a substrate wetting agent. Still further, U.S. Pat. No. 6,402,412 to Sukhna discloses an aqueous ink for a capillary action marker including a permanent water-based binder, a colored pigmented permanent water-based dispersion of sub-micron particle size, an aluminum dispersion of specific particle size, a humectant, a surfactant, an anti-settling additive, a preservative and a pH adjuster. Too frequently, however, capillary action markers containing known ink formulations do not deliver a substantially homogenous ink composition for a reasonable amount of time (much less so over the lifetime of the product) and tend to clog. Such problems are believed in part to be attributable to the density, size, morphology, and surface treatment of the metallic pigments often used in writing compositions.

Further, conventional metallic marker ink compositions often include resins that have substantially hydrophobic domains. While such resins have generally been necessary to facilitate metallic pigment delivery from the marker capillary action ink delivery system, these resins (due at least in part to their substantially hydrophobic domains) do not readily dissolve in polar (in particular, alcohol) solvents and therefore significantly non-polar solvents must be used. Unfortunately, the aggressive non-polar solvents used in these compositions have been found to swell and/or attack marker components made from inexpensive thermoplastics such as polypropylene and polyethylene. As a result, more expensive thermoplastic components manufactured from engineering thermoplastics such as nylon need to be used to obtain capillary action markers containing these conventional metallic ink compositions.

SUMMARY

The invention provides a metallic ink composition comprising a polar solvent, a metallic pigment dispersed in the solvent, and a resin component dissolved in the solvent, wherein the metallic pigment comprises a metal particle encapsulated with a coating that is substantially insoluble in the solvent and the coating comprises one or more polar molecules.

In a related aspect, the invention provides a capillary-action marker comprising an ink reservoir and a porous nib in fluid communication with the ink reservoir, the ink reservoir containing a metallic ink composition in accordance with the invention.

In another related aspect, the invention provides a method of making a written mark with a metallic ink composition comprising the steps of providing a capillary-action marker comprising an ink reservoir and a porous nib in fluid communication with the ink reservoir, the ink reservoir containing a metallic ink composition in accordance with the invention, and contacting the nib of the capillary-action marker to a substrate surface to make a written mark.

Further aspects of the invention may become apparent to those skilled in the art from a review of the following detailed description, taken in conjunction with the appended claims.

While the invention is susceptible of embodiments in various forms, described hereinafter are specific embodiments of the invention with the understanding that the disclosure is illustrative, and is not intended to limit the invention to specific embodiments described herein.

DETAILED DESCRIPTION

The invention provides a metallic ink composition comprising a polar solvent, a metallic pigment dispersed in the solvent, and a resin component dissolved in the solvent, wherein the metallic pigment comprises a metal particle encapsulated with a coating that is substantially insoluble in the solvent and the coating comprises one or more polar molecules.

Surprisingly and unexpectedly, the present inventor found that delivery of the polar solvent-based (e.g., alcohol-based) metallic ink compositions from the marker to the substrate was significantly improved by encapsulating the metal particles with a coating comprising one or more polar molecules, even when resins that have substantially hydrophobic domains are not present in the ink compositions. Further, the metallic ink compositions are delivered from the marker to the substrate even when polar solvents, which do not necessitate the use of expensive engineering thermoplastics for the marker components, are used as the predominate solvent in the metallic ink compositions. The combination of polar solvent and a metallic pigment encapsulated with a coating that is substantially insoluble in the polar solvent and that comprises one or more polar molecules has been found to be particularly advantageous in facilitating the delivery of a substantially homogeneous ink composition containing a metallic pigment with the end result being that any written markings (made using a writing instrument, particularly a capillary action marker, containing a metallic ink composition according to the invention) generally include a regular/uniform/homogeneous amount of metallic pigment and advantageously demonstrate a desired decorative effect over substantially the entire lifetime of the product. Specifically, by providing metallic ink compositions containing a metallic pigment comprising a metal particle encapsulated with a coating that is substantially insoluble in the polar solvent and in which the coating comprises one or more polar molecules, the metallic ink compositions are capable of priming the nibs of capillary action markers with metallic pigment such that unacceptable failure due to under-priming (which is believed to be attributable to the pigment becoming undesirably fixed within the fibrous ink reservoir because of undesirable interactions between the metallic pigment and the ink reservoir fibers such that little metallic pigment is delivered from the nib to the substrate when a written mark is attempted) is beneficially avoided. Because the aforementioned undesirable interactions are minimized, delivery of metallic ink including a regular/uniform/homogeneous amount of metallic pigment is advantageously observed over the life time of the product.

Without intending to be bound by theory, it is believed that polar sites found on uncoated/non-encapsulated metallic pigments increase formation of undesirable interactions between the metallic pigments themselves and also between the metallic pigments and the ink reservoir fibers resulting in pigment aggregation and/or fixation within the fibrous ink reservoir. These phenomena have been observed even with metallic pigments treated/coated with fatty acids having non-polar hydrocarbon chains such as stearic acid and oleic acid, presumptively because the fatty acid molecules can be easily displaced from the metallic pigment surface, thereby exposing polar sites on the metallic pigment surface which can cause formation of undesirable interactions within the ink reservoir fibers. It is also believed that encapsulating the metal particles with a coating comprising one or more polar molecules increases the polarity of the metal particles. In view of the foregoing, encapsulating the metal particles with a coating comprising one or more polar molecules would not be expected to reduce the problem of undesirable fixation of the pigment within the fibrous ink reservoir and thus would not be expected to improve the delivery of the metallic ink compositions. Surprisingly and unexpectedly, encapsulating the metal particles with a coating comprising one or more polar molecules wherein the coating is substantially insoluble in the polar solvent substantially improves the delivery of the polar-solvent based metallic ink compositions according to the invention.

The invention provides a capillary-action marker comprising an ink reservoir and a porous nib in fluid communication with the ink reservoir, the ink reservoir containing a metallic ink composition comprising a polar solvent, a metallic pigment dispersed in the solvent, and a resin component dissolved in the solvent, wherein the metallic pigment comprises a metal particle encapsulated with a coating that is substantially insoluble in the solvent and the coating comprises one or more polar molecules.

The invention further provides a method of making a written mark with a metallic ink composition in accordance with the invention, the method comprising: providing a capillary-action marker comprising an ink reservoir and a porous nib in fluid communication with the ink reservoir, the ink reservoir containing a metallic ink composition comprising a polar solvent, a metallic pigment dispersed in the solvent, and a resin component dissolved in the solvent, wherein the metallic pigment comprises a metal particle encapsulated with a coating that is substantially insoluble in the solvent and the coating comprises one or more polar molecules; and contacting the nib of the capillary-action marker to a substrate surface to make a written mark.

Ranges may be expressed herein as from "about" or "approximately" one particular value and/or to "about" or "approximately" another particular value. When such a range is expressed, another embodiment according to the invention includes from the one particular value and/or to the other particular value. Similarly, when particular values are expressed as approximations, but use of antecedents such as "about," "at least about," or "less than about," it will be understood that the particular value forms another embodiment.

Resins

To provide a metallic ink composition suitable for delivery via a marking instrument (e.g., a capillary-action marker), a resin component is included in the ink composition. In general, resins can have a variety of functions in the ink, for example, resins may be incorporated for pigment wetting within the liquid matrix, resins may be incorporated so as to aid film formation as the ink transits from a liquid to a plastic state during solvent dry, and resins may be incorporated to generate the adhesion generally required to bond pigments to various substrates.

In the metallic ink compositions according to the invention, the resin component is typically included in an ink in a range of about 1 wt % to about 20 wt %, about 2 wt % to about 16 wt %, about 3 wt % to about 12 wt %, about 4 wt % to about 8 wt %, and/or about 5 wt %, based on the total weight of the ink composition.

Suitable resins must show adequate solubility in the ink composition polar solvent(s). As a result, resins components suitable for use in the metallic ink compositions according to the invention generally do not include substantially hydrophobic domains. In one aspect, the term "substantially hydrophobic" refers to a resin that is not fully soluble in a polar solvent and typically will be based on the solubility of the resin in the solvent system used in the ink composition. Such resins with substantially hydrophobic domains generally have a solubility in the polar solvent of less than 3% and/or less than 1% by weight. Structurally, substantially hydrophobic domains comprise hydrocarbons, for example, straight-chain or branched alkyl, cycloalkyl, alkenyl, cycloalkenyl, and/or aryl groups comprising at least 10 carbon atoms. Resins lacking adequate solubility in the ink composition polar solvent(s) generally have substantially hydrophobic domains comprising a significant portion of the resin, for example, at least 30%, at least 40%, and/or at least 50% by weight. Exemplary resins comprising substantially hydrophobic domains include terpene resins such as SYLVAGUM™TR 105 resin (Arizona Chemical, Jacksonville, Fla.), styrenated terpene resins such as SYLVARES™ ZT 105LT resin (Arizona Chemical, Jacksonville, Fla.), styrene-methylstyrene copolymer resins such as SYLVARES™ SA 140 (Arizona Chemical, Jacksonville, Fla.), hydrocarbon resins such as BITONER C9 modified C5 Resin C-2100 and BITONER hydrogenated C9 resins (Bitoner, Qingdao, China), natural rubbers such as isoprene resins, amber resins, alkyd resins, vinylidene fluoride/hexafluoropropylene such as VITON, and phenylene sulfide resins. Of course, these are merely representative of substantially hydrophobic resins and do not encompass each example thereof. Typically, the ink compositions of the invention are substantially free of resins containing substantially hydrophobic domains, e.g., the ink compositions contain less than 0.50 wt. %, less than 0.20 weight percent, less than 0.10 weight percent of such resins.

Suitable resins include resins that are amphiphilic. By possessing both polar and nonpolar domains, such amphiphilic resin components can, for example, facilitate adhesion of the metallic ink compositions to a variety of surfaces, including both polar and nonpolar surfaces. Additionally, suitable resins typically demonstrate various other beneficial properties, including, but not limited to, resistance to abrasion, chemicals, and environmental sources of damage such as light, heat and moisture.

Suitable resins include resins having number average molecular weights (Mn) in a range of about 500 Daltons to more than 1 million Daltons, about 1000 Daltons to about 100,000 Daltons, and/or about 2000 Daltons to about 10,000 Daltons. The preferred number average molecular weight for a given resin will depend on various factors, including the desired adherence level and/or the desired final viscosity of the ink composition.

Suitable resins include, but are not limited to, one or more resins selected from polyvinyl butyral resins, polyacrylic acid resins, styrene-acrylic acid resins, polyamide resins, shellac resins, terpene phenolic resins, ketone-aldehyde condensation resins, polyurethane resins, polyester resins, and mixtures thereof. Suitable resins are available from Sekisui Chemical Co., Ltd. (Osaka, Japan), Kuraray Co., Ltd. (Tokyo, Japan), BASF (Ludwigshafen, Germany), DSM NeoResins (Waalwijk, The Netherlands), Xi'an Aladdin Biological Technology Co., Ltd. (Shaanxi, China), Arizona Chemical Company (Jacksonville, Fla.), and Evonik Industries AG (Essen, Germany). Exemplary commercially available resins include, but are not limited to, BL-2 polyvinylbutyral resin (Sekisui Chemical Co., Ltd.), B-30H polyvinylbutyral resin (Kuraray Co., Ltd.), JONCRYL 682 or JONCRYL 67 styrene-acrylic acid resin (BASF), NEOCRYL N819 polyacrylic acid resin (DSM NeoResins), VERSAMID 759 polyamide resin (BASF), shellac resin (Xi'an Aladdin Biological Technology Co., Ltd.), TP300 terpene phenolic resin (Arizona Chemical Company), VARIPLUS TC ketone-aldehyde condensation resin (Evonik Industries AG), SILICOPUR polyurethane resin (Evonik Industries AG), and VESTICOAT UB polyester resin (Evonik Industries AG).

Metallic Pigments

A metallic pigment is included in the metallic ink compositions according to the invention so as to provide a shimmering, sparkle, or glitter effect (i.e., an effect produced by the multi-directional reflection of light).

Surprisingly and unexpectedly, encapsulating metal particles with a coating that is substantially insoluble in the metallic ink composition solvent and that comprises one or more polar molecules has been found to be particularly significant for obtaining consistently enhanced writing performance of capillary action markers comprising a polar solvent-based metallic ink composition according to the invention. For example, when a metallic ink composition comprises an uncoated/non-encapsulated metallic pigment (i.e., the metallic pigment is not a metallic pigment comprising a metal particle encapsulated with a coating which comprises one or more polar molecules and is substantially insoluble in polar solvent), but is polar-solvent based and is otherwise prepared according to the invention, a capillary action marker comprising said metallic ink composition eventually delivers little to no metallic pigment to a substrate even though a significant amount of ink composition remains therein. Without intending to be bound by theory, such markers are believed to deliver little to no metallic pigment because the metallic ink pigment is undesirably interacting with the fibers of the ink reservoir such that it becomes fixed within the reservoir. The end result is a written trace with a low density of the metallic pigment.

The metallic pigment component comprising a metal particle encapsulated with a coating according to the invention advantageously functions to assist in delivery of the metallic pigment as the ink composition of the invention is drawn to the nib from the fibrous ink reservoir via capillary-action and dispensed upon marking (e.g., making a written marking with the ink composition of the invention). Thus, encapsulation of the metal particles with a coating promotes delivery of the metallic pigment from the capillary-action marker and is surprisingly able to effect such delivery when the coating is substantially insoluble in the metallic ink composition polar solvent and the coating comprises one or more polar molecules, even when resins that have substantially hydrophobic domains are not included in the metallic ink composition.

Suitable metal particles include, but are not limited to, metal particles capable of functioning as pigments such as metal particles comprising copper, zinc, aluminum, bronze, mica, oxides thereof, anodizes thereof, and combinations of any of the foregoing. The aforementioned metal particles are encapsulated with a coating to obtain the metallic pigments of the invention. The coating is substantially insoluble in the solvent of the metallic ink composition and the coating comprises one or more polar molecules.

As used herein, the term "substantially insoluble in the solvent" refers to a solubility of the coating of the pigment particles in the ink composition solvents(s) that is typically less than 1 mg/mL, for example, less than 0.5 mg/mL, less than 0.2 mg/mL, less than 0.1 mg/mL, less than 0.05 mg/mL, less than 0.01 mg/mL, and/or most preferably less than 0.001 mg/mL. Such insolubility can be confirmed using standard solubility testing techniques, for example, by weighing a given amount of pigment particles before and after introduction into a given amount of polar solvent. For convenience, and because the metallic pigments are known to be completely insoluble in polar solvents such that the only component that can dissolve is the coating itself, the parameter is measured relative to the weight of the pigment particles. Other methods for confirming insolubility include measuring the refractive index of the pigment before and after exposure to the solvent.

As used herein, the term "polar molecule" refers to a molecule that has a nonzero dipole moment. Polar molecules typically have a dipole moment of at least 0.5 debye, at least 1 debye, at least 1.5 debye, at least 2 debye, at least 3 debye, at least 4 debye, and/or at least 5 debye.

Suitable coatings include, but are not limited to, coatings comprising metal oxides and/or coatings comprising organic polymers. Preferred metal oxide coatings include, but are not limited to, coatings comprising silicon dioxide, alumina oxide, tin oxide, and/or titania. Such coatings may be translucent, but translucency is not required since the thickness of the coating typically is not great enough to mask the underlying reflective surface of the metallic pigment. Preferred organic polymer coatings include, but are not limited to, coatings comprising urea-aldehyde polymer resins (e.g., urea-formaldehyde resins) and alkyl- and aryl-substituted derivatives thereof, such as methyl urea-formaldehyde resins, phenyl urea-formaldehyde resins, and the like. Other suitable examples include the condensation products of urea with aldehydes such as acrolein, butyraldehyde, formaldehyde, paraformaldehyde, methylhemiformal, butylhemiformal, formaldehyde sodium bisulfite adduct, glyoxal, acetaldehyde, benzaldehyde, furfural, phthalaldehyde, and terephthaldehyde. Suitable polymer resins typically contain polar functional groups such as hydroxyl, carboxyl, amino, ester, amide, ether, and the like.

Suitable metallic pigments encapsulated with a coating are available from a number of pigment manufacturers such as, for example, Schlenk Metallic Pigments GmbH (Roth, Germany), Eckart GmbH (Hartenstein, Germany), Silberline Manufacturing Co., Inc. (Tamaqua, Pa.), and Paist (Huizhou, China). The metallic pigment particles are typically initially provided in powder form (rather than as a paste) so as to provide greater control over the formulation. Of course, pastes can also be used.

Representative commercially available metallic pigments encapsulated with a coating comprising polar molecules and which is substantially insoluble in the (polar) solvent include, but are not limited to, AQUAMET or POWDAL series silicon dioxide-coated aluminum pigments (Schlenk Metallic Pigments GmbH), STAPA HYDROLAN silicon dioxide-coated aluminum pigment (Eckart GmbH), SILO-WET 651 silicon dioxide-coated aluminum pigment (Silberline Manufacturing Co., Inc.), Noah's Ark W-series silicon dioxide-coated aluminum pigments (Paist), GRANDAL urea-aldehyde resin-coated aluminum pigments (Schlenk Metallic Pigments GmbH), ANNUAL RING R-series urea-aldehyde resin-coated aluminum pigments (Paist), CONSTANT silicon dioxide-coated pigments such as AQUADOR COPPER silicon dioxide-coated bronze pigment (Schlenk Metallic Pigments GmbH), and CONSTANT silicon dioxide-coated pigments such as CONSTANT 2280/N RICH GOLD silicon dioxide-coated bronze-zinc pigment (Schlenk Metallic Pigments GmbH). While the foregoing metallic pigment examples typically have satisfactory particle diameters for use in capillary-action markers containing a metallic ink composition according to the invention, it should be noted that other metallic pigments can be processed, e.g., wet sieved, to control/reduce their particle sizes in order to further enhance the performance of a capillary-action marker containing same.

In one aspect, aluminum metal particles encapsulated with a coating which is substantially insoluble in a polar solvent and comprises one or more polar molecules are used as the metallic pigment. In another aspect, bronze metallic pigments comprising copper/zinc alloy particles encapsulated with a coating which is substantially insoluble in a polar solvent and comprises one or more polar molecules are used as the metallic pigment. Of course, other elements such as nickel, lead, manganese, phosphorus, and silicon can also be included in the copper/zinc alloy of the bronze pigments. In bronze metallic pigments comprising copper/zinc alloy without any additional elements, the weight ratio of copper to zinc can be suitably varied between about 50:50 and about 95:5, for example, about 90:10, between about 55:45 and about 90:10, between about 60:40 and about 80:20, for example, about 70:30, to provide "goldbronze" metallic pigments.

The metallic pigment typically has a density of from about 2.5 grams/cubic centimeter (g/cc) to about 12.5 g/cc, about 4 g/cc to about 11 g/cc, and more typically from about 6 g/cc to about 10 g/cc at 20° C.

Preferably, the metallic pigment has a substantially planar morphology. Such substantially planar metallic pigments are often referred to in the industry as being corn flakes, silver dollars, or vacuum metalized pigments. Substantially planar metallic pigments are extremely thin typically having a thickness between about $1/5^{th}$ and about $1/250^{th}$ and/or between about $1/10^{th}$ and about $1/100^{th}$ of the particle diameter. Generally, the substantially planar metallic pigments have an average thickness from about 0.01 microns to about 1 micron, about 0.05 microns to about 0.50 microns, and/or about 0.08 microns to about 0.20 microns. Typically, the substantially planar metallic pigments have an average thickness of less than about 0.50 microns, less than about 0.25 microns, and/or less than about 0.10 microns.

The average dimensions of the pigment particles can be ascertained by performing scanning electron microscopy (SEM). Typically, the pigments have an average diameter of from about 0.5 microns to about 12 microns; preferably, the pigments have an average diameter from about 1 microns to about 10 microns; even more preferably, the pigments have an average diameter from about 5 microns to about 9 microns, for example, from 6 microns to about 8 microns. These sizes are generally preferred in the inks according to the invention in as much as such metallic pigments have demonstrated minimized settling in a capillary-action marker system over time, and also do not clog the nib such that the dispensation of the ink from a capillary-action marker is interrupted.

In general, the largest dimension of the pigment particles is limited by the need for the pigment particles to pass through the capillary channels in the porous nibs and fibrous reservoirs of capillary action markers and by the requirement that the pigment particles form stable suspensions that do not settle over time. The smallest dimension of the pigment particles is generally selected to limit penetration of the particles into the interstices of the intended substrate material as such penetration can diminish the intended decorative effect.

Typically, a metallic pigment is included in the ink composition in an amount of about 5 wt % to about 40 wt %, about 7.5 wt % to about 35 wt %, about 10 wt % to about 30 wt %, about 12.5 wt % to about 25 wt %, about 20 wt %, about 5 wt % to about 30 wt %, about 5 wt % to about 25 wt %, about 5 wt % to about 20 wt %, about 5 wt % to about 15 wt %, and/or about 10 wt % based on the total weight of the ink composition.

Solvent(s)

A polar solvent is included in the metallic ink compositions to dissolve the resin component and to provide a continuous phase vehicle for the dispersed metallic pigments.

Surprisingly and unexpectedly, metallic ink compositions according to the invention are delivered to the substrate from markers loaded with metallic pigments comprising metal particles encapsulated with a coating comprising polar molecules even when polar solvents are used as the predominate solvent in the metallic ink compositions. As a result, use of aggressive non-polar solvents in the metallic ink compositions can be avoided, advantageously allowing marker components for markers loaded with the metallic ink compositions to be made from less expensive thermoplastics such as polypropylene and polyethylene.

Generally, the polar solvent comprises an organic solvent. The polar solvent generally does not contain substantial amounts of water, e.g., the solvent generally contains less than about 10 wt % water, preferably less than about 5 wt % water, more preferably less than about 1 wt % water, and even more preferably less than 0.1 wt % water. Additionally, while aromatics may be included, for example to enhance the solubility of selected resin components, the ink composition generally does not contain substantial amounts of aromatics, e.g., the ink composition generally contains less than about 5 wt % aromatics, more preferably less than about 1 wt % aromatics, and even more preferably less than 0.1 wt % aromatics.

Suitable polar solvents include polar protic and polar aprotic solvents. The polar solvent generally is present in an amount of about 30 wt % to about 95 wt %, about 40 wt % to about 90 wt %, and/or more preferably about 55 wt % to about 85 wt %, based on the total weight of the ink composition.

In one aspect, the polar solvent comprises a polar protic solvent, for example, one or more alcohol solvents. Suitable alcohol solvents include one or more C1 to C15 alcohols, such as C2 to C10 alcohols, and/or C2 to C5 alcohols. The alcohol solvent can be a straight chain alcohol, a branched alcohol, a cyclic alcohol, or a mixture of the foregoing. Representative alcohol solvents include, but are not limited to, ethanol, propanol (e.g., isopropanol and/or n-propanol), butanol (e.g., isobutanol and/or n-butanol), pentanol (e.g., isopentanol and/or n-pentanol), hexanol, and mixtures thereof. Other suitable protic solvents include monoalkylated polyethers such as dipropyleneglycol monoether.

In one aspect, the solvent comprises an polar aprotic solvent. Representative aprotic polar solvents include, but are not limited to, dimethylsulfoxide, dimethylacetamide, dimethylformamide, formamide, N-methylpyrrolidinone, N-methyl morpholine, propylene carbonate, ethylene carbonate, acetonitrile, esters such as ethyl acetate, ketones such as methylisobutylketone (MIBK) and acetone, tetrahydrofuran, cyclohexanone, toluene, and mixtures thereof. Combinations of polar protic and polar aprotic solvents, including the polar protic and polar aprotic solvents specifically mentioned above, are also contemplated.

Marker Assemblies

The marker includes an ink reservoir disposed in a housing or barrel. The ink reservoir is in fluid communication with a porous nib. The barrel is typically sealed by a plug, which helps to keep the ink reservoir in place.

Typically, the ink reservoir and the nib are disposed in such a manner relative to each other that the ink composition can be transferred from the ink reservoir to the nib via migration as a result of the ink reservoir being in fluid communication with the nib. The ink composition generally moves by capillary-action within the reservoir, i.e., the ink composition generally moves by capillary-action from the distal end of the reservoir to the reservoir end which is proximate to the nib. Similarly, the ink composition generally moves within the nib by capillary-action, i.e., the ink composition generally moves by capillary-action from the portion of the nib which is proximate to the reservoir to the portion of the nib which is applied to a substrate to make a written mark. Loading and priming of the ink reservoirs and the nibs, respectively, can advantageously be carried out over a wide temperature range from about 0° F. to about 77° F.

According to a preferred embodiment, the ink reservoir is a wick-type reservoir, and the fibrous nib is in continuous (i.e., permanent) contact therewith. In one embodiment, the coupling zone provides a large surface area for the migration of a metallic ink composition from the reservoir to the nib (relative to the size of the nib). The coupling zone on the reservoir is usually at least about the same, at least about 1.5 times greater than, and/or at least about 2 times greater than the corresponding greatest diameter of the nib.

Capillary-action markers useful for delivering ink compositions containing metallic pigment particles comprise ink reservoirs having a relatively open structure. Suitable reservoirs for use in the markers according to the invention preferably have a reservoir fiber density less than about 0.50 g/cc, more preferably less than about 0.25 g/cc and most preferably less than about 0.10 g/cc.

The reservoir fibers can be manufactured from thermoplastic polymers such as, for example, polyesters, nylons, and mixtures thereof (provided that the fibers are insoluble in the ink composition). The fibers inside the reservoir can be linearly-oriented or entangled. To maintain the integrity of the ink reservoir, the reservoir may be wrapped with a sheet of polypropylene or high density polyethylene. Surprisingly, not only are nylon wraps unnecessary, they can be undesirable. In certain instances, nylon wraps have been found to detrimentally affect the performance of markers according to the invention, for example, by causing the markers to leak. The reservoirs can be of any dimensions as long as the dimensions are sufficient for storing a predetermined amount of ink and for permitting the reservoir to fit into the desired marker body or housing.

The nibs should be sufficiently porous to allow the metallic pigment particles to pass freely therethrough. The nib also should prevent ink compositions from leaking when the nib is downwardly disposed. Fibers of the nib should be compatible with (i.e., insoluble in) the ink composition solvent system and capable of retaining the ink composition. Suitable nib fibers can be manufactured from thermoplastic polymers such as, for example, polyesters, acrylics, nylons, and combinations thereof.

Methods of Preparing and Additives

A metallic ink composition according to the invention can be prepared by standard methods. Generally, a metallic pigment is dispersed in a solvent, the resin is dissolved in a solvent and additional solvent can be added to adjust the ink composition viscosity. A capillary-action marker containing the inventive ink composition can then be prepared according to standard processing methods.

The viscosity of the metallic ink composition at 25° C. is usually less than about 40 centipoises (cps), less than about 25 cps, and/or less than about 10 cps, for example, about 1 cps to about 40 cps, about 1 cps to about 25 cps, about 1 cps to about 10 cps, about 1.5 cps to about 5 cps, for example, about 2 cps. However, the ranges provided above can shift higher or lower, depending on the nature and porosity of the nibs and the fiber density of the ink reservoirs used in the markers according to the disclosure.

The ink may optionally contain other additives such as, for example, surface tension modifier(s), other synergic resin(s), surfactant(s), non-volatile solvent(s), co-solvent(s), dispersing agent(s), humectants(s), rheological additive(s), biocide(s) and other additives known in the art. These additives can be added to the ink compositions in an amount such that the overall performance of the ink compositions is not adversely affected in any aspect.

The ink compositions and writing instruments in accordance with the disclosure can be better understood in light of the following examples, which are merely intended to illustrate the markers and ink compositions and are not meant to limit the scope thereof in any way.

EXAMPLES

Metallic ink formulations 1 to 6 were prepared by combining the ingredients identified in Table 1 in the amounts shown and mixing until a homogenous mixture was achieved. The ink compositions were then loaded into markers equipped with an ink reservoir and a porous nib to obtain metallic markers.

TABLE 1

| Component (wt %) | Function | 1 | 2 | 3 | 4 | 5 | 6 |
|---|---|---|---|---|---|---|---|
| Ethanol, SDA 3C, denatured by 5% IPA (Nexon) | Solvent | 85 | 85 | 85 | 85 | 85 | 85 |
| AQUAMET 170 (Schlenk Metallic Pigments GmbH) | Silicon dioxide-coated Aluminum pigment | 10 | 10 | 10 | 10 | — | — |
| CONSTANT 4117/N Pale Gold (Schlenk Metallic Pigments GmbH) | Silicon dioxide-coated Bronze pigment | — | — | — | — | 10 | — |
| METAGLOSS 1500 (Schlenk Metallic Pigments GmbH) | Un-coated Aluminum pigment (stearic acid-treated) | — | — | — | — | — | 10 |
| Shellac R-49 (Xi'an Aladdin Biological Technology Co., Ltd.) | Shellac Resin | 5 | — | — | — | — | — |
| JONCRYL 67 (BASF) | Styrene-Acrylic Acid Resin | — | 5 | — | — | — | 5 |
| VERSAMID 917 (BASF) | Polyamide Resin | — | — | 5 | — | 5 | — |
| VARIPLUS TC (Evonik Industries AG) | Ketone-Aldehyde Condensation Resin | — | — | — | 5 | — | — |
| Color Intensity | | 5 | 5 | 5 | 5 | 5 | 2 |

The markers containing ink formulations 1 to 5 and comparative ink formulation 6 were used to make written marks on paper. Line/color intensity of the marker was observed and rated on a visual scale of 1 to 5, in which a score of 5 means a bright, opaque silvery line was observed and a score of 1 means the line was almost invisible. While not intending to be bound by any particular theory, it is believed that the low color intensity score for comparative ink formulation 6 is due to pigment fixation in the reservoir and/or nib of the marker, resulting in a reduced flow of pigment, low pigment transfer, and written lines of low opacity and/or low brightness. The unacceptable performance of this marker showed that replacing a coated pigment with an uncoated/non-encapsulated pigment significantly affected the capability for delivering the metallic pigment particles from the marker. In contrast, markers containing ink formulations 1 to 5 demonstrated that markers containing ink compositions according to the invention provide superior uniform delivery of the metallic ink compositions to the substrate, with no evidence of clogging of the nib.

What is claimed is:

1. An ink composition comprising:
(a) a polar, protic solvent;
(b) a metallic pigment dispersed in the solvent; and
(c) a resin component dissolved in the solvent, wherein the polar, protic solvent is present in an amount of about 35 wt % to about 95 wt % based on the total weight of the ink composition, the metallic pigment comprises a metal particle encapsulated with a coating that is substantially insoluble in the solvent and the coating comprises silicon dioxide.

2. The ink composition of claim 1, wherein the solvent is an alcohol solvent.

3. The ink composition of claim 1, wherein the solvent comprises one or more C1 to C15 alcohols.

4. The ink composition of claim 1, wherein the metallic pigment comprises a metallic pigment selected from the group consisting of copper, zinc, aluminum, bronze, mica, oxides thereof, anodizes thereof, and combinations of any of the foregoing.

5. The ink composition of claim 1, wherein the metallic pigment comprises aluminum.

6. The ink composition of claim 1, wherein the metallic pigment comprises a copper/zinc alloy.

7. The ink composition of claim 1, wherein the viscosity of the metallic ink composition at 25° C. is less than about 40 centipoises (cps).

8. The ink composition of claim 1, wherein the metallic pigment has a substantially planar morphology.

9. The ink composition of claim 1, wherein the metallic pigment has an average thickness between about 0.01 microns to about 1 micron.

10. The ink composition of claim 1, wherein the metallic pigment has an average diameter between about 0.5 microns and about 12 microns.

11. The ink composition of claim 1, wherein the metallic pigment is present in an amount between about 5 wt % and about 40 wt %, based on the total weight of the ink composition.

12. The ink composition of claim 1, wherein the ink composition has a total resin content between about 1 wt % and about 20 wt %, based on the total weight of the ink composition.

13. The ink composition of claim 1, wherein the resin component comprises one or more resins selected from the group consisting of polyvinyl butyral resins, polyacrylic acid resins, styrene-acrylic acid resins, polyamide resins, shellac resins, terpene phenolic resins, ketone-aldehyde condensation resins, polyurethane resins, polyester resins, and mixtures thereof.

14. The ink composition of claim 1, wherein the coating comprises an organic polymer.

15. The ink composition of claim 1, wherein the ink composition is substantially free of resins containing substantially hydrophobic domains.

16. The ink composition of claim 1, wherein the polar solvent comprises a C2-C5 alcohol, and the metallic pigment comprises an aluminum particle encapsulated with a coating comprising silicon dioxide.

17. A marker comprising:

an ink reservoir and a porous nib, the ink reservoir containing an ink composition comprising a metallic ink composition comprising:

(a) a polar, protic solvent;

(b) a metallic pigment dispersed in the solvent; and (c) a resin component dissolved in the solvent, wherein the metallic pigment comprises a metal particle encapsulated with a coating that is substantially insoluble in the solvent and the coating comprises silicon dioxide.

18. A method of making a written mark, comprising:

providing a capillary-action marker comprised of an ink reservoir and a porous nib, the ink reservoir containing an ink composition according to claim 1; and contacting the nib of the capillary-action marker to a substrate surface to make a written mark.

19. The ink composition of claim 1, wherein the polar, protic solvent is present in an amount of about 40 wt % to about 90 wt % based on the total weight of the ink composition.

20. The ink composition of claim 1, wherein the coating consists of silicon dioxide.

21. The ink composition of claim 1, wherein the coating is in contact with the polar, protic solvent.

22. The marker of claim 17, wherein the ink reservoir is wrapped with a sheet comprising polypropylene or high density polyethylene.

* * * * *